US006154948A

United States Patent [19]

Williams, Jr.

[11] Patent Number: 6,154,948

[45] Date of Patent: Dec. 5, 2000

[54] ROTARY GRINDER CUTTING BLOCK

[76] Inventor: Robert M. Williams, Jr., 9721 Litzinger Rd., Ladue, Mo. 63124

[21] Appl. No.: 09/391,871

[22] Filed: Sep. 8, 1999

Related U.S. Application Data

[62] Division of application No. 09/168,634, Oct. 8, 1998.

[51] Int. Cl.[7] .......... B23Q 3/00

[52] U.S. Cl. .......... 29/464; 403/359.1; 403/359.6; 144/223; 144/230

[58] Field of Search .......... 403/359.6, 359.1, 403/383; 29/464; 144/230, 223; 241/242, 73

[56] References Cited

U.S. PATENT DOCUMENTS

| | | |
|---|---|---|
| 1,721,183 | 7/1929 | McKain . |
| 3,151,645 | 10/1964 | Hesse . |
| 3,986,543 | 10/1976 | Slayton et al. . |
| 4,000,859 | 1/1977 | Whitney . |
| 4,151,869 | 5/1979 | Halloran et al. . |
| 4,257,566 | 3/1981 | Lawrence . |
| 4,350,307 | 9/1982 | Olson . |
| 4,385,732 | 5/1983 | Williams . |
| 4,538,655 | 9/1985 | Berkeley . |
| 4,750,455 | 6/1988 | Ebesu . |
| 4,785,860 | 11/1988 | Arasmith . |
| 5,052,630 | 10/1991 | Hinsey . |
| 5,118,047 | 6/1992 | Carpenter et al. .......... 242/241 |
| 5,201,353 | 4/1993 | Weill . |
| 5,269,355 | 12/1993 | Bowen . |
| 5,320,293 | 6/1994 | Laly et al. . |
| 5,395,057 | 3/1995 | Williams, Jr. et al. . |
| 5,419,502 | 5/1995 | Morey . |
| 5,452,860 | 9/1995 | Williams . |
| 5,474,239 | 12/1995 | Williams, Jr. et al. . |
| 5,486,728 | 1/1996 | Hirama . |
| 5,522,441 | 6/1996 | Anselm et al. . |
| 5,547,136 | 8/1996 | Steffens et al. . |
| 5,611,495 | 3/1997 | Williams . |
| 5,695,134 | 12/1997 | Williams . |
| 5,730,375 | 3/1998 | Cranfill et al. . |
| 5,743,472 | 4/1998 | Williams, Jr. et al. . |
| 5,785,583 | 7/1998 | Williams, Jr. et al. . |

FOREIGN PATENT DOCUMENTS

| | | |
|---|---|---|
| 9903586 | 1/1999 | WIPO . |

*Primary Examiner*—P. W. Echols
*Assistant Examiner*—Anthony L. Green
*Attorney, Agent, or Firm*—Polster, Lieder, Woodruff & Lucchesi, L.C.

[57] ABSTRACT

An interchangeable cast metal block for mounting on a rotor shaft, the shaft having a polygonal cross-section. The block includes a substantially circular body having a central bore complementary to the polygonal cross-section of the rotor shaft such that the rotation of the shaft will turn the block. There are at least two opposed cutting blade mounting bosses for attachment of cutting blades on the external surface of the block. The mounting bosses are positioned on the block in a predetermined geometric arrangement relative to a facet of the polygonal center bore such that the block can be reversed and re-mounted on the rotor shaft to effectively double the available number of cutting blade positions. The number of available cutting blade positions is two times the number of facets on the polygonal center bore. A plurality of the blocks may be stacked on the rotor in an array to provide a plurality of cutting blade patterns along the length of the rotor shaft.

3 Claims, 8 Drawing Sheets

ROTARY GRINDER CUTTING BLOCK

CROSS-REFERENCE TO RELATED APPLICATIONS

This is a divisional application Ser. No. 09/168,634 filed Oct. 8, 1998.

BACKGROUND OF THE INVENTION

This application relates generally to rotary grinding and shredding devices and, more particularly, to an interchangeable rotary block for mounting as part of an array of blocks on a rotor shaft, the block including at least one cutting blade mounting boss positioned in a geometric arrangement relative to the center bore of the block so that the block can be reversed on the rotor shaft to effectively double the number of available positions of each cutting blade. A plurality of blocks are stacked on the rotor shaft in an array to form a desired pattern of cutting blades along the length of the rotor assembly.

Apparatus for the grinding reduction of materials, for example waste woods or plastics are known in the art. Generally speaking, as shown in FIGS. 1, 2, and 3 the apparatus 10 for use with the rotor assembly 12 of the present invention which is mounted in a frame 14 adjacent a material inlet 16, driven by a motor 18 and belt 20. The rotor assembly 12 of the present invention includes a shaft 22 having cutting blades 24 mounted thereon. In some embodiments, a hydraulic ram 26 is included to urges the material toward the rotor assembly 12 of the present invention. Often, in prior art, a rotor assembly is machined from a solid billet of steel. Individual cutting blades are machined into the surface of the rotor at discrete positions along the length of the rotor. In other embodiments, the rotor includes bosses for mounting cutting blades. The cutting blades, generally replaceable, are bolted or otherwise mounted on the bosses. The cutting blade mounting bosses are machined along the length of the rotor in a desired pattern so that the attached cutting blades are positioned in a corresponding pattern.

Machining the rotor from a solid billet of metal, whether it includes cutting blades or bosses for replaceable blades, has obvious drawbacks. The process is expensive and labor intensive. Furthermore, the cutting blade pattern of the resulting rotor cannot be changed. Inventors have made attempts to overcome these disadvantages. For example, U.S. Pat. No. 5,474,239 to Williams, Jr. et al. discloses a shaft driven set of blocks in which each block has cutting blades in circumferentially spaced relation. The blocks are keyed to the shaft to form a predetermined cutting blade arrangement. Each block has its own keyway which receives a common key extended along the length of the rotor shaft. Each adjacent block has its keyway rotated to a position such that the blades on the block are offset from the blades on adjacent blocks by a predetermined angular relationship.

It will be appreciated, however, that each block must be individually constructed for a specific position on the shaft and, although the design functions well for its intended purposes, the versatility of the blocks is limited. It would be advantageous, therefore, to have a shaft and block arrangement wherein each block can be mounted on the shaft in any of a plurality of positions, and is not limited by the position of a keyway. Furthermore, it would be advantageous if the block can be reversed on the shaft to effectively double the number of possible positions of the block relative to the number of sides on the shaft and, therefore, double the number of possible positions of the cutting blades on the surface of the block relative to the shaft configuration (number of sides).

BRIEF SUMMARY OF THE INVENTION

Among the several objects and advantages of the present invention are:

The provision of a reversible mounting block wherein the block is adapted for keyless installation on a polygonal shaft of a rotary grinder;

The provision of the aforementioned mounting block wherein the block includes mounting bosses positioned to provide reversible configurations of cutting blades;

The provision of the aforementioned mounting block wherein the positioning of the blade mounting bosses is determined relative to the polygonal configuration of a central bore complementing the rotary grinder polygonal shaft;

The provision of the aforementioned mounting block wherein the exterior surface of the block is configured with a flange to prevent entrapment of ground material between the mounting block and a ram; and The provision of the aforementioned mounting block wherein the blocks are easy to manufacture, may be arranged in multiple arrayed configurations on a rotor shaft, and facilitate repair and replacement of cutting blades.

According to the invention, generally stated, a substantially circular interchangeable cast metal block for mounting on a polygonal rotor shaft is provided, the shaft having a polygonal cross-section. The block includes a body section having a center bore configured complementary to the polygonal cross-section of the rotor shaft so that the rotation of the shaft will turn the block. The outer surface of the block includes at least one cutting blade mounting boss for the mounting and removable attachment of cutting blades. The mounting boss is positioned on the block in a predetermined geometric arrangement relative to a facet of the polygonal center bore of the block such that the block can be reversed and re-mounted on the shaft to effectively double the available number of cutting blade positions. The number of available unique cutting blade positions available on any block after the block is installed on the rotor shaft is equal to twice the number of facets on the polygonal pattern of the center bore. For example, if the center bore on the block is a hexagon, a single cutting blade can be positioned in six different positions around the rotor shaft with the block in a first orientation. Removal and reversal of the block on the shaft provides for an additional six different cutting blade positions. By stacking a plurality of blocks on the rotor in an array, a plurality of cutting blade patterns along the length of the rotor may be formed. These cutting blade patterns are important to directing the flow of material within the grinding and shredding device. Numerous prior art patents have attempted to provide a means for adjusting the cutting blade patterns, such as is shown in U.S. Pat. No. 5,320,293 to Laly et al., and U.S. Pat. No. 5,201,353 to Weill, but none have achieved a flexible and versatile design which allows for rapid adjustment of cutting blade patterns.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation The description clearly enables one skilled in the art to make and use the invention, describes several embodiments, adaptations, variations, alternatives, and uses of the invention, including what we presently believe is the best mode of carrying out the invention.

Figure 1:
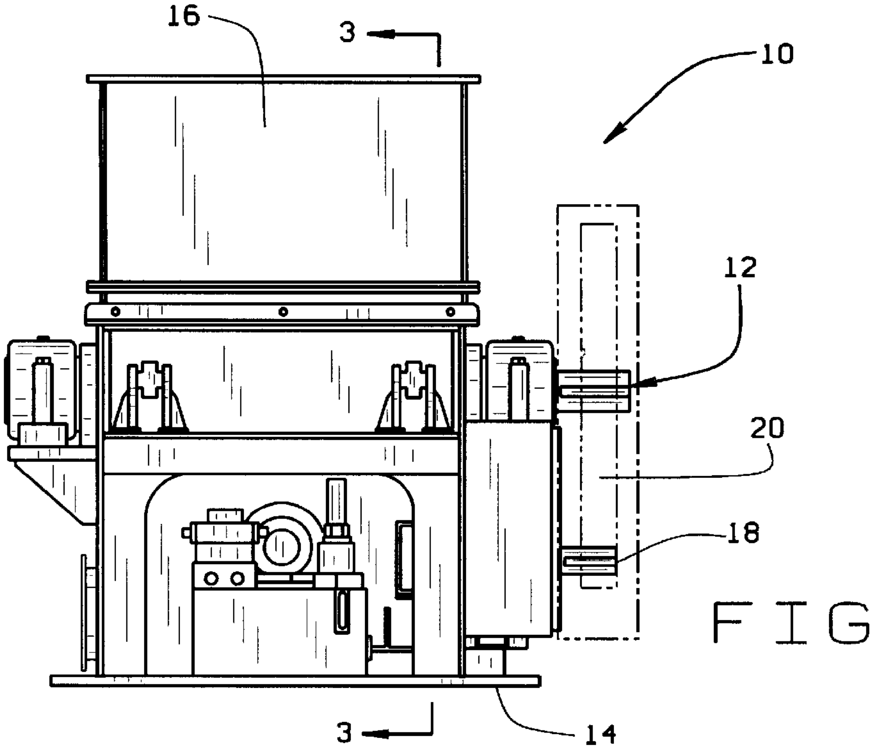
FIG. 1 is an end view of an apparatus for the grinding reduction of materials.
Figure 2:
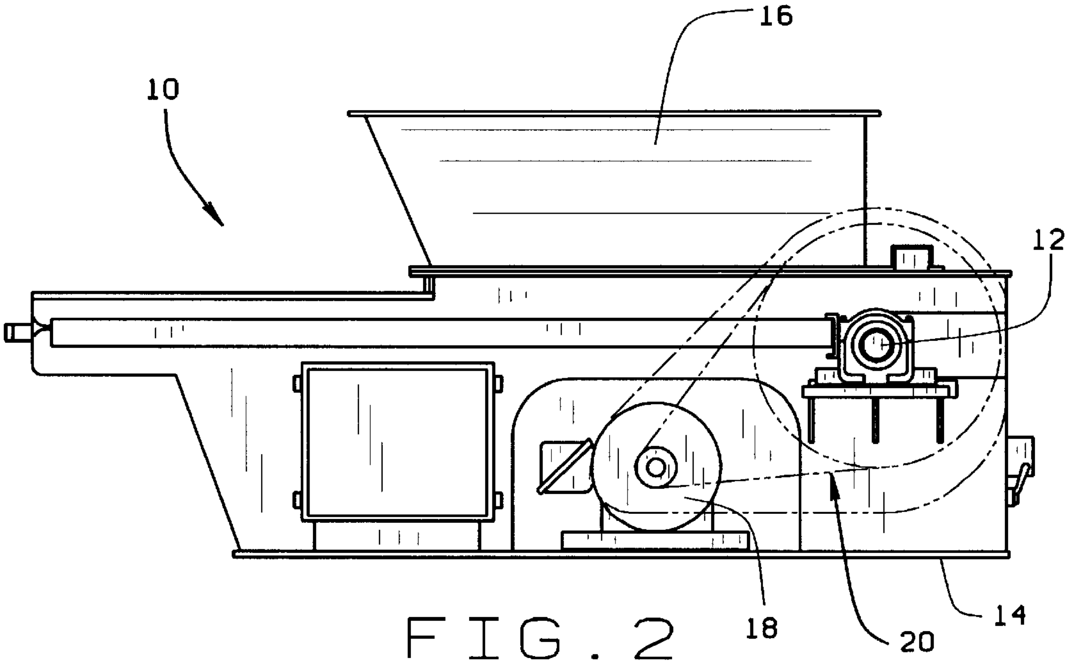
FIG. 2 is a side view of the apparatus of FIG. 1, with the motor cover and drive belt components removed.
Figure 3:
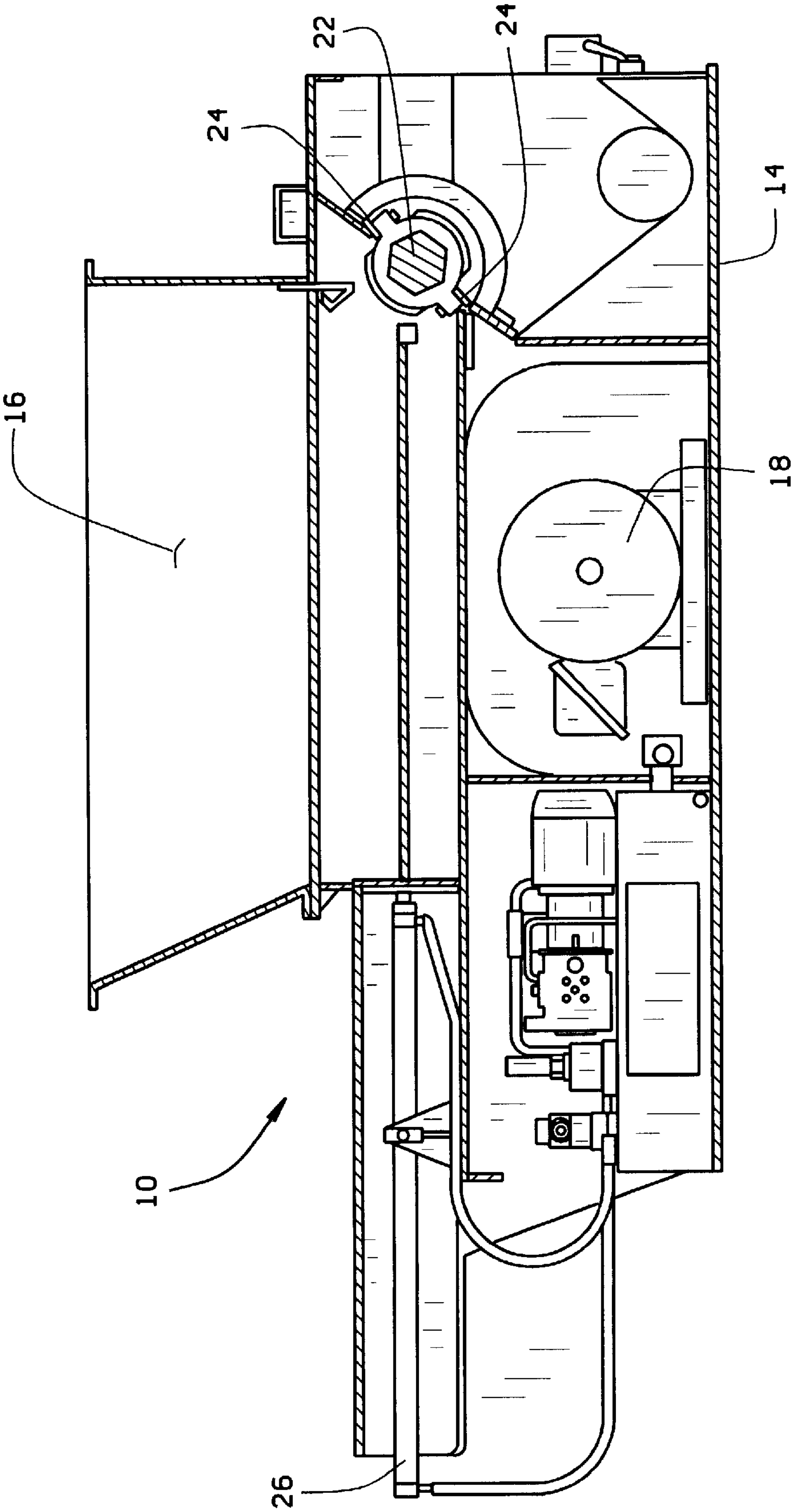
FIG. 3 is a side sectional view of the apparatus of FIG. 1, taken along line 3—3 in FIG. 1.
Figure 4A:
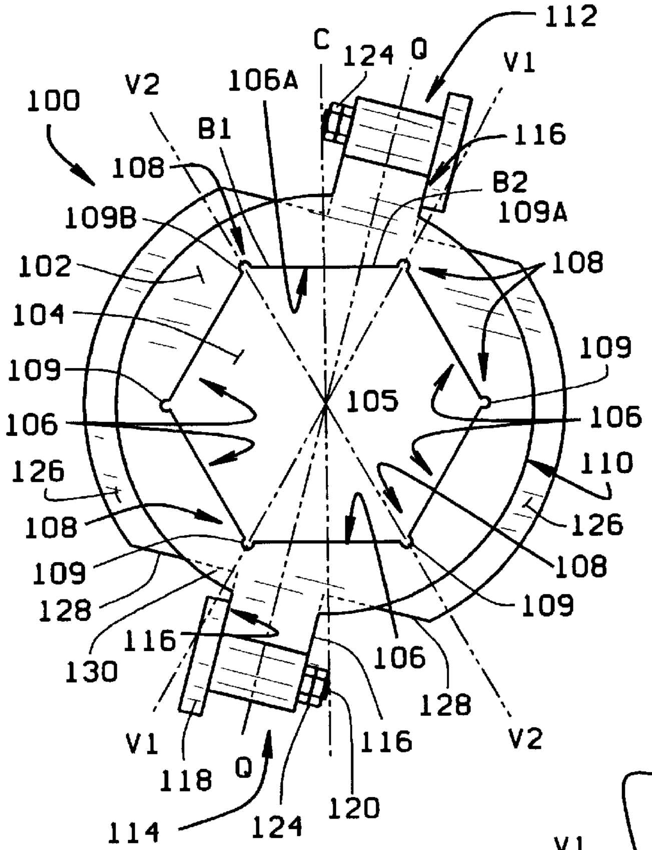
FIG. 4A is a top plan view of a rotor block of the present invention, illustrating the placement of the cutting blade bosses relative to the polygonal center bore.
Figure 4B:
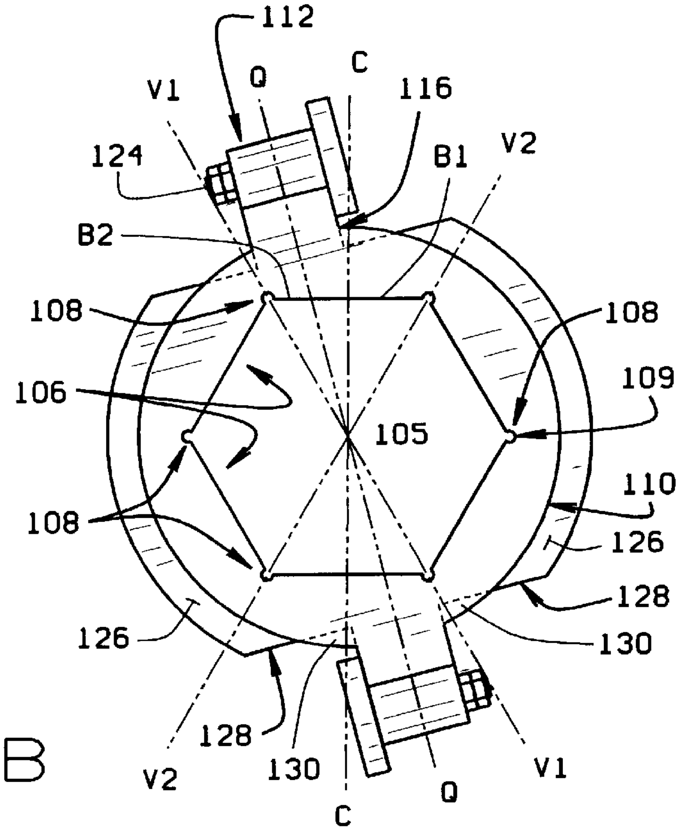
FIG. 4B is a top plan view of the rotor block of FIG. 4A in a reversed position, illustrating the complementary positions of the cutting blade bosses.
Figure 4C:
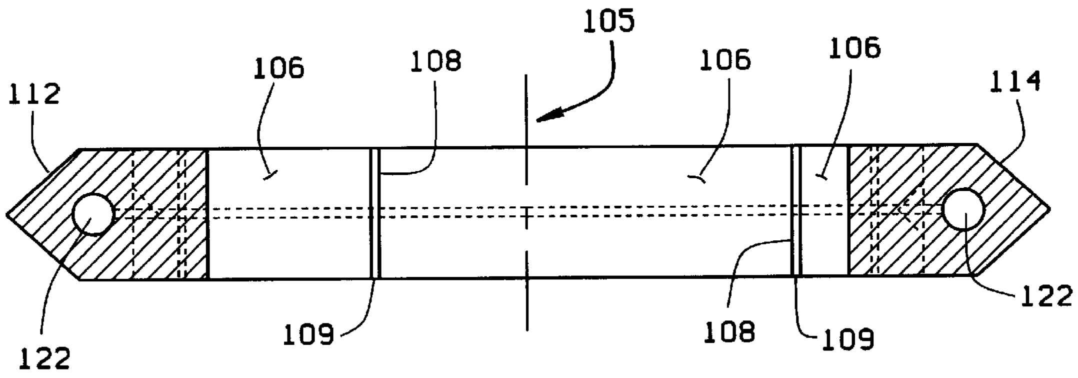
FIG. 4C is a side sectional view of the rotor block of FIG. 4A, taken along line 4C—4C.
Figure 4D:
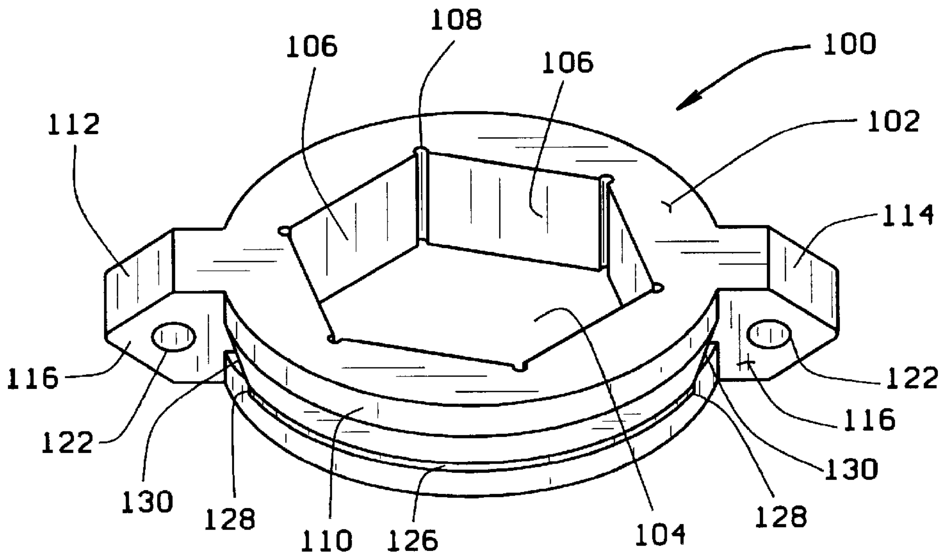
FIG. 4D is a perspective illustration of the rotor block of FIG. 4A.

Turning to FIG. 4A and FIG. 4D, a rotor block of the present invention is shown generally at 100. The rotor block 100 comprises a circular body 102 having a polygonal center bore 104 positioned about an axis 105 with a number of faces or facets 106 separated by verticies 108, corresponding to the polygonal configuration of the rotor shaft 22 (seen in FIG. 3) upon which the rotor block 100 is mounted. In one preferred embodiment shown in FIG. 4A through FIG. 4D, the polygonal center bore 104 includes six identical faces 106, defining a hexagonal bore, with each vertex 108 relieved at 109 to prevent rounding or stripping of the rotor shaft 22 during high-torque loads.

The circular body 102 of the rotor block 100 includes a cylindrical outer surface 110, upon which a cutting blade boss 112 is positioned. The positioning of the cutting blade boss 112 on the surface 110 is selected in relation to the polygonal center bore 104 so as to maximize the number of unique positions in which the cutting blade boss 112 may be mounted about rotor shaft 22. To determine the placement of the cutting blade boss 112, a first vertex line V1—V1 is established between a vertex 109A and the axis 105. A second vertex line V2—V2 is established at an adjacent vertex 109B through the axis 105. The first and second vertex lines, together with the enclosed face 106A of the polygonal center bore 104 define a triangular region having the enclosed face 106A as a base. Bisecting the base establishes a facet centerline C—C for the enclosed face 106A, which is perpendicular to face 106A and further divides the face into two equal base segments B1 and B2. One base segment, in the example illustrated in FIG. 4A, base segment B2, is selected and bisected to establish a facet quarter-line Q—Q between the base segment bisection point and the axis 105. The cutting blade boss 112 is then positioned on the outer surface 110 such that a mid-line of the boss 112 is radially aligned with the quarter-line Q—Q. In the preferred embodiment illustrated in FIGS. 4A–4D, a second cutting blade boss 114 is positioned on the outer surface 110 diametrically opposite the first cutting blade boss 112, radially aligned with quarter-line Q—Q.

Each cutting blade boss 112, 114 includes oppositely disposed and identical cutting blade attachment faces 116A and 116B to which a cutting blade 118 may be secured by means of a threaded bolt 120 passing through a bore 122 in the boss 112, 114. A retaining nut 124 secured to the threaded bolt 120 opposite the cutting blade 118 holds the cutting blade 118 flush with the blade attachment face 116A, for example. As is apparent from reference to FIGS. 4A and 4B, flipping the rotor block 100 and reversing the attachment of the cutting blades 118, 118 to the opposite face 116B of the bosses 112 and 114 allows for two possible blade configurations for each unique orientation of the polygonal center bore 104, hence doubling the available positions for a single cutting blade 118.

Figure 5:
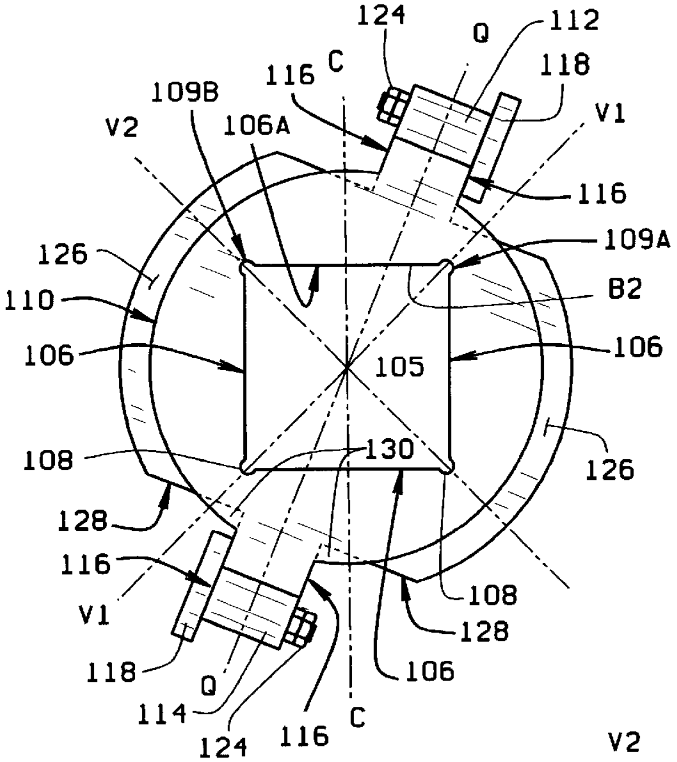
FIG. 5 is a top plan view of a rotor block similar to FIG. 4A, having an alternative center bore configuration.
Figure 6:
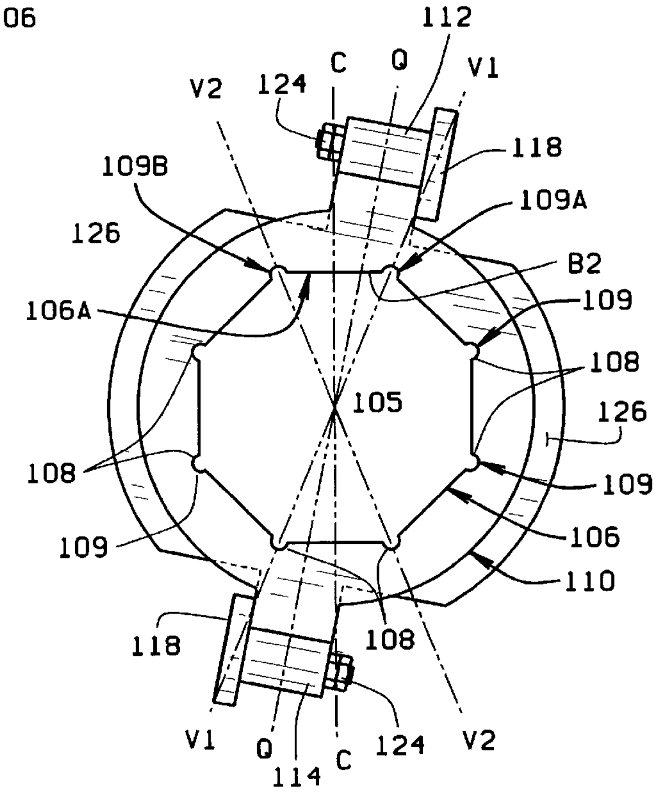
FIG. 6 is a top plan view of a rotor block similar to FIG. 5, with a second alternative center bore configuration.
Figure 7A:
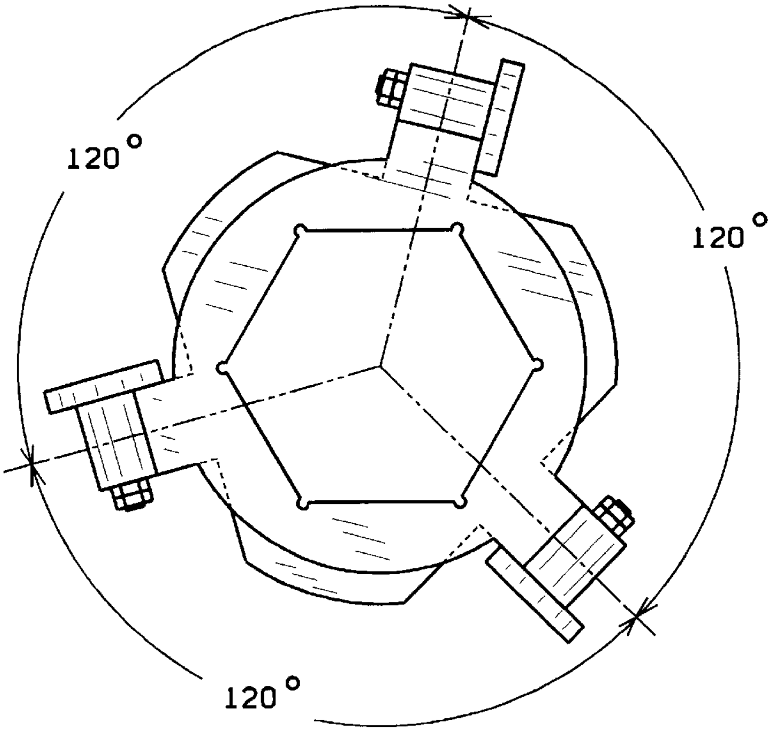
FIG. 7A is a view similar to FIG. 4*a,* illustrating an alternative embodiment employing three cutting blade bosses positioned equidistant about the circumference of the rotor block.
Figure 7B:
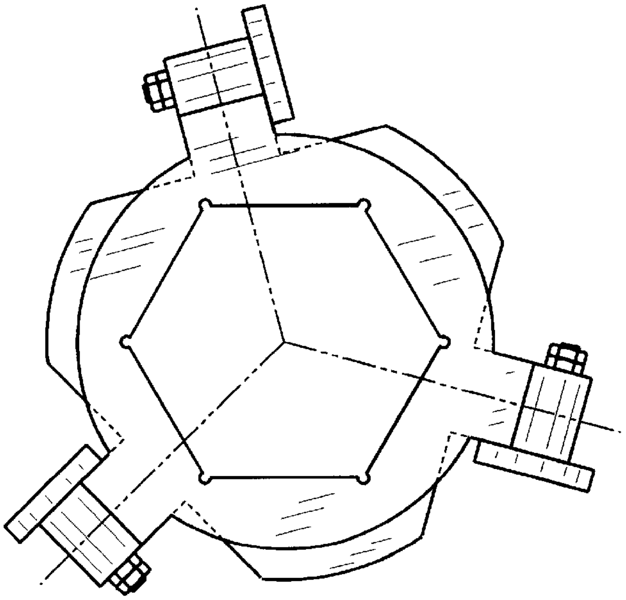
FIG. 7B is a view similar to FIG. 4B, showing the rotor block of FIG. 11A in a reversed position and illustrating the complementary positions of the cutting blade bosses.

Turning to FIGS. 5 and 6, it will be readily apparent to one skilled in the art that the positioning technique described above may be utilized with rotor blocks 100 having polygonal center bores 104 having fewer than, or more than, six faces as shown in FIGS. 4A–4D. Similarly, once a first cutting blade boss 112 is positioned relative to a polygonal center-bore face 106A, any number of additional cutting blade bosses may be positioned on the outer cylindrical surface 110 in an equidistantly spaced relationship to the first cutting blade boss 112. For example, FIGS. 7A and 7B illustrate the placement of three cutting blade bosses 112, 112A, and 112B. First, cutting blade boss 112 is positioned as described above. Then, the circumference of the surface 110 is divided in as many equal arcuate portions as there are cutting blade bosses, and a cutting blade boss positioned at the intersection of each arcuate portion. As can be seen in FIGS. 7A and 7B, reversal of the rotor block 100 and altering of the cutting blade 118 attachment to the cutting blade bosses 112, 112A, and 112B results in each blade 118 having a total number of possible positions equal to twice the number of faces in the polygonal center-bore 104.

As is readily apparent from observing the figures, the use of multiple cutting blades 118 on a rotor block 100 will reduce the number of unique positions in which the rotor block 100 may be mounted on the rotor shaft 22. For example, while a single cutting blade 118 affixed to a rotor block 100 having a hexagonal center bore 104 will yield twelve possible unique blade positions (including reversal of the rotor block 100), the use of a second cutting blade affixed diametrically opposite the first cutting blade will reduce the number of unique positions to six. Correspondingly, the use of three cutting blades as shown in FIGS. 7A and 7B will reduce the number of unique rotor block orientations to four.

Further included on the outer surface 110 of the rotor block 100 is a circumferential material displacement flange 126. The material displacement flange 126 extends perpendicular to the outer surface 110, and is disposed in the longitudinal center-plane of the body 102. It will be appreciated that flange 126 prevents the binding of material to surface 110, particularly material under pressure from ram 26. In the preferred embodiment, as best seen in FIG. 4A–FIG. 7B, portions of the displacement flange 126 adjacent each cutting blade attachment face 116 on the cutting blade boss 112 are resected perpendicular to each cutting blade attachment face 116, forming identical bevels 128 to facilitate the attachment of the blade 118 thereto. To further facilitate the attachment of a cutting blade 118 to an attachment face 116 of each cutting blade boss 112, the outer surface 110 of the rotor block 100 includes a plurality of identical graduated channels 130 extending from the base of each flange bevel 128 to each adjacent attachment face 116. Each graduated channel 130 includes sloped sidewalls 132 and 134, and is graduated at the same angle as the adjacent bevel 128, terminating perpendicular to the attachment face 116 as best seen in FIG. 4A and 4B. One skilled in the art will recognize that the resected bevels 128 and the graduated channels 130 adjacent each cutting blade boss 112 may be reduced in size or eliminated if the cutting blade boss 112 extends sufficiently far from the outer surface 110 to permit attachment of a cutting blade 118 without interference with either the outer surface 110 or the material displacement flange 126.

Figure 8:
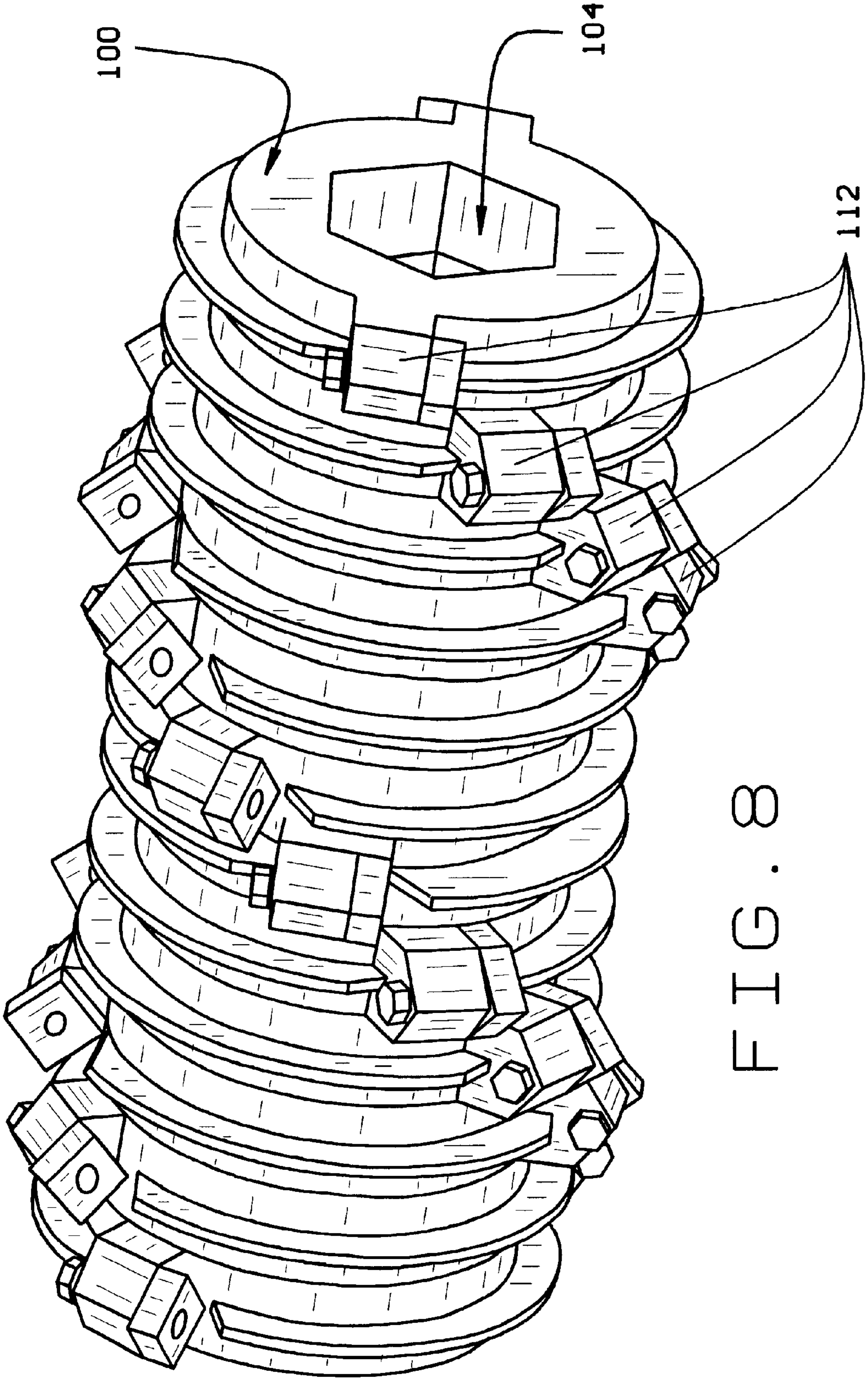
FIG. 8 is a perspective illustration of a number of rotor blocks of FIGS. 4A and 4B arranged in an array for installation on a rotor shaft.
Figure 9:
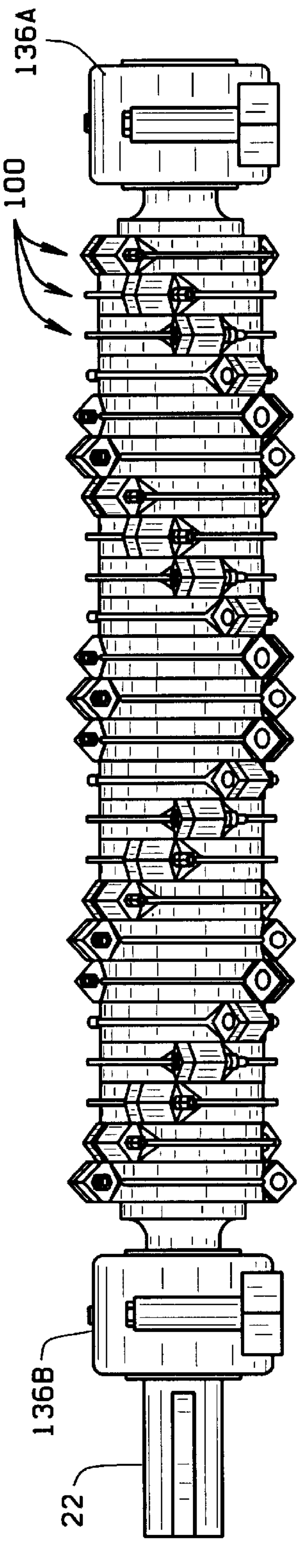
FIG. 9 is a top plan view of a number of rotor blocks of the present invention installed on a rotor shaft in an arrayed configuration.
Figure 10:
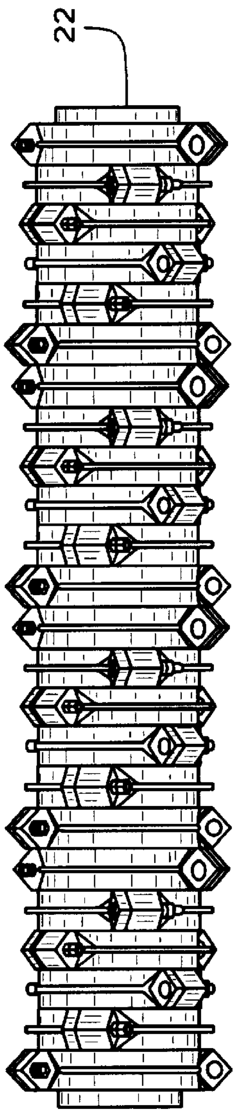
FIG. 10 is a view similar to FIG. 9, illustrating an alternative arrayed configuration of the rotor blocks.
Figure 11:
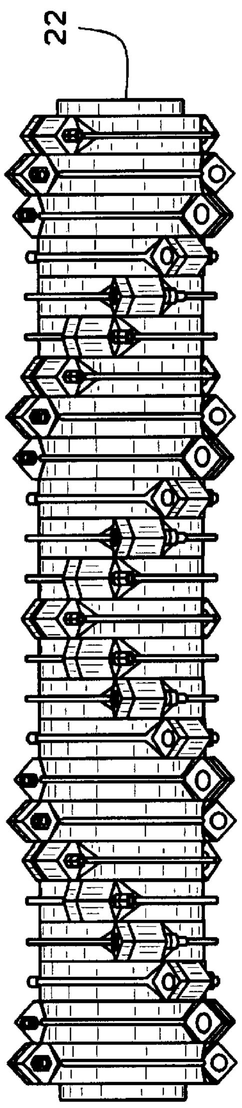
FIG. 11 is a view similar to FIG. 9, illustrating a second alternative arrayed configuration.

Turning to FIG. 8 through FIG. 11, a number of rotor blocks 100 of the present invention (as illustrated in FIGS. 4A–4D) are shown arranged for mounting on a rotor shaft 22. By positioning the cutting blade bosses 112 of adjacent rotor blocks 100 in different orientations about the central bore 104 and correspondingly about the rotor shaft 22, cutting blades 118 may be secured to the cutting blade bosses 112 to form a variety of patterns along the length of the rotor shaft 22. Once stacked in the desired configuration, such as shown in FIG. 8, the rotor blocks are placed about the rotor shaft 22, and secured thereto by placement of roller bearing pillows blocks 136A and 136B at each end thereof As will be recognized, different patterns of cutting blade placement will direct the flow of ground or cut material over the rotor block array in a desired manner, for example, either outwardly towards the ends of the array as shown in FIG. 9, or inwardly towards the center of the array as shown in FIG. 11. These numerous configurations of cutting blades 118 are realized through the advantages gained by the specific placement of the cutting blade mounting bosses 112 relative to the center bore 104 of each rotor block 100, maximizing the number of unique blade positions possible for a given rotor shaft 22 polygonal configuration.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method for positioning a cutting blade mounting boss on an exterior surface of a circular rotor block having a polygonal center bore, comprising the steps of:

establishing an axial center of said rotor block;

establishing a pair of vertex points for a face of said polygonal center bore;

defining a triangle between said axial center and said pair of vertex points, said face of said polygonal center bore establishing a base of said triangle;

bisecting said base to establish a facet centerpoint, said facet centerpoint and one of said pair of vertex points defining a base segment;

bisecting said base segment to establish a facet quarter-point, a radial projection from said axial center through said facet quarter-point defining a facet quarter-line; and centering said cutting blade mounting boss over said facet quarter-line on said exterior surface of said rotor block.

2. The method of claim 1 further including positioning an additional cutting blade mounting boss on said exterior surface diametrically opposite said centered cutting blade mounting boss.

3. The method of claim 2 further including positioning a plurality of additional cutting blade mounting bosses on said exterior surface, said plurality of additional cutting blade mounting bosses and said centered cutting blade mounting boss spaced equidistantly apart from each other.

* * * * *